(12) United States Patent
Ikeda et al.

(10) Patent No.: US 7,304,699 B2
(45) Date of Patent: Dec. 4, 2007

(54) LIQUID CRYSTAL DISPLAY PANEL

(75) Inventors: Masahiro Ikeda, Kawasaki (JP);
Manabu Sawasaki, Kawasaki (JP);
Hidetoshi Sukenori, Kawasaki (JP);
Tetsuya Fujikawa, Kawasaki (JP);
Shiro Hirota, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/806,914

(22) Filed: Mar. 23, 2004

(65) Prior Publication Data

US 2004/0239840 A1    Dec. 2, 2004

(30) Foreign Application Priority Data

Mar. 31, 2003    (JP)    .............................. 2003-097103

(51) Int. Cl.
    *G02F 1/1335*    (2006.01)
(52) U.S. Cl. ...................... 349/106; 349/107; 349/108; 349/109
(58) Field of Classification Search ........ 349/106–109, 349/155, 105
    See application file for complete search history.

(56) References Cited

U.S. PATENT DOCUMENTS

| | | | | |
|---|---|---|---|---|
| 5,910,829 A * | 6/1999 | Shimada et al. | ............ | 349/110 |
| 5,978,061 A * | 11/1999 | Miyazaki et al. | ........... | 349/155 |
| 6,259,505 B1 * | 7/2001 | Makino | ...................... | 349/153 |
| 6,348,958 B1 * | 2/2002 | Matsuoka et al. | .......... | 349/106 |
| 6,552,764 B2 * | 4/2003 | Fujioka et al. | .............. | 349/106 |
| 7,050,137 B2 | 5/2006 | Hoshino et al. | | |
| 2002/0196393 A1 * | 12/2002 | Tashiro et al. | .............. | 349/106 |
| 2005/0083471 A1 * | 4/2005 | Ono et al. | ................... | 349/143 |
| 2006/0125993 A1 | 6/2006 | Hoshino et al. | | |
| 2006/0125994 A1 | 6/2006 | Hoshino et al. | | |

FOREIGN PATENT DOCUMENTS

| | | |
|---|---|---|
| JP | 9-49916 | 2/1997 |
| JP | 9-101540 | 4/1997 |
| JP | 10-206867 | 8/1998 |
| JP | 2000-29014 | 1/2000 |
| JP | 2002-341330 | 11/2002 |
| JP | 2003-035909 | 2/2003 |
| JP | 2003-172946 | 6/2003 |
| JP | 2003-195339 | 7/2003 |
| JP | 2003-215556 | 7/2003 |

* cited by examiner

*Primary Examiner*—David Nelms
*Assistant Examiner*—(Nancy) Thanh-Nhan P Nguyen
(74) *Attorney, Agent, or Firm*—Greer, Burns & Crain, Ltd.

(57) ABSTRACT

A LCD panel is disclosed that provides improved performance of the frame area that surrounds the panel's display area. The frame area includes a transparent substrate, and color filters provided side-by-side on the transparent substrate, each of the color filters filtering one of at least two colors. The LCD panel is further constituted by a first electrode that counters the color filters, a second electrode that counters the first electrode, and liquid crystal that is inserted between the electrodes. Display spots are suppressed and the frame can appear in a desired color when the panel is in operation.

10 Claims, 10 Drawing Sheets

LIQUID CRYSTAL DISPLAY PANEL

BACKGROUND OF THE INVENTION

1. Field of the Invention

The present invention generally relates to a liquid crystal display (LCD), and especially relates to a liquid crystal display panel capable of displaying color images.

2. Description of the Related Art

Generally, a LCD displays a desired image on a front display area by irradiating a backlight from the rear side of the LCD through a liquid crystal layer, the orientation of which is controlled. At this instance, in order to suppress leakage of excessive light from the circumference of the display area of the LCD, it is common to provide a black frame area around the circumference of the display area.

FIG. 1 shows a typical view of the LCD panel. The LCD panel includes a display area 102 for displaying an image, and a frame area 104 that is provided around the circumference of the display area 102. The frame area 104 usually has a width (w) of about 2 mm, for example, varying by uses.

FIG. 2 shows a cross-sectional view of a conventional LCD panel, being the first example, which includes a display area 202 and a frame area 204. The cross section illustrated is near the boundary of the display area 202 and the frame area 204, and the cross section can be considered to show the portion indicated by reference number 108 of FIG. 1. The conventional LCD panel includes thin film transistors (TFTs) 208 that are formed on a glass substrate 206. A pixel electrode 210 is connected to each of the TFTs 208 that control charging and discharging of pixels of the display area 202. Corresponding to each of the pixel electrodes 210, color filters 214 are formed on another glass substrate 212, where the color filters consist of three parts, each being differently colored, namely, red (R), green (G), and blue (B). The width of each of the color filters 214 varies with uses; however, the width is about 100 micrometers per color, for example. The color filters 214 are connected to a common electrode 216 (sometimes called a counter-electrode) that is connected to a reference voltage such as ground potential. The pixel electrode 210 and the common electrode 216 are made from, e.g., ITO (indium tin oxide). Further, a shading film 218 called a black matrix layer (BM layer) is formed on the frame area 204 side of the glass substrate 212. The shading film 218 is made from, e.g., chromium (Cr), the thickness of which ranges between 0.1 and 0.2 micrometers. The glass substrates 206 and 212 are supported by a sealing material 220 and bead spacers 222 that are provided between the glass substrates, and liquid crystal is enclosed between the glass substrates.

In the first example of the conventional LCD panel, the light for display (backlight) is irradiated from the side of the glass substrate 206. In the display area 202, an image is displayed on the side of the glass substrate 212 with the TFTs 208 controlling the voltage between the electrodes 210 and 216 such that the orientation of liquid crystal molecules is controlled. At this instance, although light is also provided to the frame area 204, the light is reflected or shaded by the shading film 218, and the light does not reach the glass substrate 212. In this manner, unnecessary light, which does not contribute to an image, is prevented from leaking to the front, i.e., the glass substrate 212 side.

FIG. 3 shows a partial cross-sectional view of the second example of the conventional LCD panel. The same reference number is given to each element that is the same as explained in FIG. 2. The second example differs from the first example in that a resin black layer having a thickness of between 1 and 1.5 micrometer forms a shading film 219. Further, a protection layer (overcoat layer) 217 made of acrylic resin is formed between the counter-electrode 216 and the color filters 214, and on the shading film 219.

FIG. 4 shows a partial cross-sectional view of the third example of the conventional LCD panel. The same reference number is given to each element that is the same as explained in FIG. 2. The third example differs from the first and second examples in that the shading film 219 made of resin and the color filters 214 are prepared on the side of the TFTs 208. This structure is often called CFonTFT (Color Filter on Thin Film Transistor).

According to the LCD panels as shown in

FIG. 2 through FIG. 4, the shading film (BM layer) 218 or 219, as applicable, made of metal or resin, respectively, is provided in the frame area 204 that surrounds the display area 202. In this manner, excessive light is prevented from leaking. However, these LCD panels need to form the shading film in the frame area, which requires a manufacturing process in addition to making the display area. The additional manufacturing process, raising the manufacturing cost, is the problem with the LCD panels shown in FIG. 2 through FIG. 4.

FIG. 5 shows a partial cross-sectional view of the fourth example of the conventional LCD panels. The same reference number is given to each element that is the same as explained in FIG. 2. In the fourth example, three color filters 215 that are layered are provided to the frame area 204. The backlight that enters the frame area is sharply attenuated by passing through three color filters 215, such that unnecessary light is prevented from penetrating toward the substrate 212. The material and the thickness of each of the three color filters 215 are the same as the color filters 214 of the display area 202. Therefore, the color filters 215 of the frame area 204 and the color filters 214 of the display area 202 can be simultaneously manufactured. Accordingly, the number of manufacturing processes is reduced as compared with the examples shown in FIG. 2 through FIG. 4. The LCD panel having the structure of the fourth example is indicated by patent reference 1.

[Patent reference 1]

JP,2000-29014, A

[Problem(s) to be Solved by the Invention]

Nevertheless, the structure as shown in FIG. 5 has another problem in that a level difference d is generated between the display area 202 and the frame area 204. Although the level difference varies with implementation, when the thickness of the color filters is set at 1.8 micrometers, for example, the level difference d can become as great as 2 to 3 micrometers. Due to the level difference d, the interval (cell gap) of the LCD panel becomes greater in the circumference section (frame area) than the central part (display area). For this reason, brightness in the circumference section becomes higher than the central part, causing display spots, and degrading image quality of the display area 202 near the frame area 204.

Further, since the level difference d makes the flow passage for the liquid crystal narrow in the frame area 204, as compared with the display area 202, when the liquid crystal is to fill the space between the two glass substrates 206 and 212, the flowing speed of the liquid crystal is decreased. This decreases production throughput in the manufacturing process of the LCD panel. Furthermore, the level difference may make it difficult for the liquid crystal to fill all the corners.

FIG. 6 shows a partial cross-sectional view of the fifth example of the conventional LCD panels. The same reference number is given to each element that is the same as explained in FIG. 2. In the fifth example, only one color filter 215 (B) is formed in the frame area, the color filter (B) being blue-colored with low permeability. According to this example, while the problem about the level difference as described in connection with the example of FIG. 5 is solved, the shading effect is insufficient because only one color filter 215 is used, and the ability to show the frame in black, i.e., the frame performance, is degraded. In the fifth example, the frame area 202 appears bluish rather than pure black. Specifically, the optical-density (OD) value (the higher the OD value, the higher the shading ability) of the shading film 218 that consists of metal or resin in the cases of FIG. 2 through FIG. 4 ranges between 3 and 4. On the other hand, the OD value in the case of FIG. 6 is 2.0 or less. That is, in the fifth example shown in FIG. 6, the frame performance is sacrificed for solving the problem of the level difference.

SUMMARY OF THE INVENTION

Accordingly, it is a general object of the present invention to provide a LCD panel having enhanced frame performance, and substantially obviating one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a LCD panel particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a LCD wherein the frame area includes multiple color filters, rather than only one-color filter being used as is the case with conventional practices. In this manner, the LCD according to the present invention provides enhanced frame performance without using a BM layer, avoids display spots near the frame, and avoids unintended coloring of the frame.

DESCRIPTION OF THE PREFERRED EMBODIMENTS

In the following, embodiments of the present invention are described with reference to the accompanying drawings.

Figure 7:
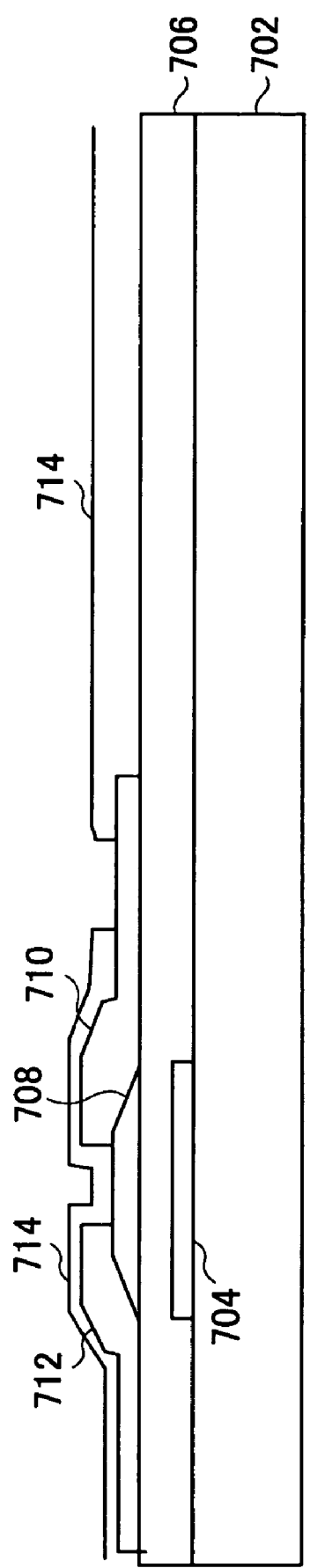
FIG. 7 is a cross-sectional view of a structure with a TFT formed for manufacturing the LCD panel according to an embodiment of the present invention.

FIG. 7 shows the basic structure of a TFT formed when a LCD panel is manufactured according to the embodiment of the present invention. In general terms, the TFT is formed as follows. For example, an electric conduction film for forming a gate electrode on a transparent substrate 702 that is made of glass is formed. The electric conduction film consists of, e.g., aluminum (Al) having 150 nm thickness, molybdenum nitride (MoN) having 90 nm thickness, and molybdenum (Mo) having 10 nm thickness. A photosensitive resist is applied all over the electric conduction film, and a desired form is imprinted; after exposing unnecessary portions of the electric conduction film, etching is carried out; and a gate electrode (gate bus line) 704 is formed by removing the photosensitive resist. On the gate electrode 704 and the transparent substrate 702, an insulator layer 706 consisting of silicon nitride (SiN) of 350 nm thickness is formed. A semiconductor layer 708 consisting of an amorphous silicon is formed in the position that counters the gate electrode 704 on the insulator layer 706. Further, a source electrode 710, and a drain electrode 712 that are connected to the semiconductor layer 708 are formed. The source and the drain electrodes 710 and 712 consist of titanium (Ti) having 20 nm thickness, Al having 75 nm thickness, and Ti having 80 nm thickness. Patterning of the source electrode 710 and the drain electrode 712 is carried out by photolithography. Then, a protective coat 714 consisting of, for example, SiN having 330 nm thickness is formed.

Figure 8:
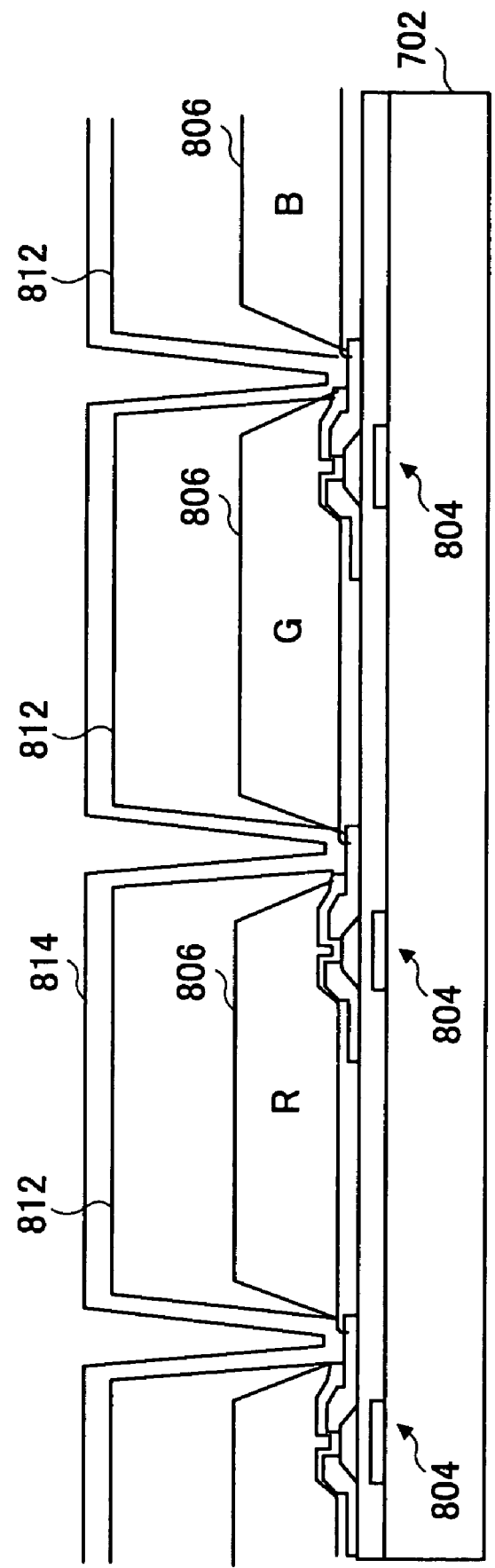
FIG. 8 is a cross-sectional view of a structure formed by a process after the structure of FIG. 7 is obtained.

FIG. 8 shows the structure to be formed after the structure shown in FIG. 7 is obtained. In FIG. 8, the TFT 804 formed on the transparent substrate 702 by the process for making the structure shown in FIG. 7 is drawn in a simplified form. Color filters 806 are formed for each TFT 804. The color filters 803 are formed with 1.8 micrometers thickness and patterning of the color filter in a desired form is carried out using photolithography. Since color filters are formed for every color, the patterning is performed 3 times, namely, for red (R), green (G), and blue (B). In this manner, according to the embodiment of the present invention, the color filters 806 are formed in both display area and frame area without distinguishing the display area from the frame area, unlike the conventional LCD panels.

A protective coat (overcoat layer) 812 made of a transparent resin having, e.g., 2.0 micrometers thickness is formed such that the color filters 806 are covered and protected. Furthermore, a pixel electrode 814 made of ITO having, e.g., 70 nm thickness is formed on the protective coat 812. In addition, the pixel electrode 814 is connected to the source electrode of the TFT 804. When patterning the pixel electrode 814 on the protective coat 812, patterning is carried out such that an electrode (common electrode) 814' is also formed in the frame area (see FIG. 9.).

Figure 9:
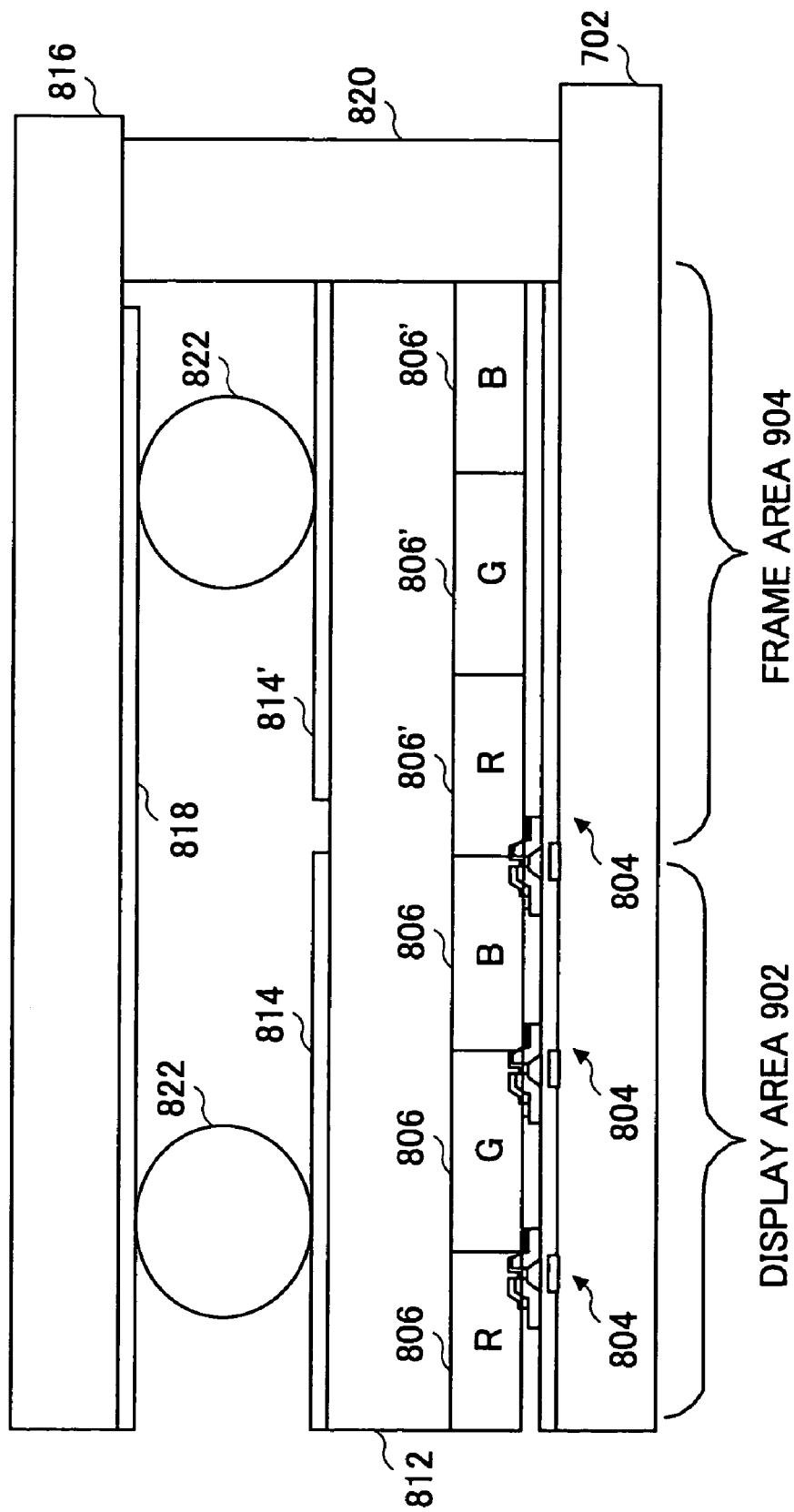
FIG. 9 is a cross-sectional view of a structure formed by a process after the structure of FIG. 8 is obtained.

FIG. 9 shows the structure to be formed after the structure shown in FIG. 8 is obtained. The color filters 806, the protection layer 812, and the pixel electrode 814 are illustrated in a simplified manner; specifically, level differences are omitted in FIG. 9. A transparent substrate 816 is provided separate from the transparent substrate 702, and a counter-electrode 818 is formed under the transparent substrate 816 as illustrated, the counter-electrode 818 countering the electrodes 814 and 814' on the side of the transparent substrate 702. An orientation film is provided to each of the electrodes 818, 814, and 814' for regulating the orientation of liquid crystal molecules. The two transparent substrates 702 and 816 are stuck together using a sealing material 820 and bead spacers 822, maintaining a suitable interval such as 4 micrometers between them. The transparent substrates 702 and 816, which are attached as indicated above, are cut according to the desired size of the LCD panel. Henceforth, air between the transparent substrates 702 and 816 is extracted, reducing the space between the transparent substrates 702 and 816 to a vacuum state; then, the space is filled with liquid crystal by dipping the structure into liquid crystal, and, in this manner, the basic structure of the LCD panel is completed.

According to the embodiment of the present invention, many, for example, dozens of sequences of color filters 806' are provided in the frame area 904 like the display area 902. The electrode 814', which is connected to the reference voltage, is provided corresponding to the color filters 806' in the frame area 904. Furthermore, the electrode 814' counters the counter-electrode 818 through the liquid crystal.

Figure 1:
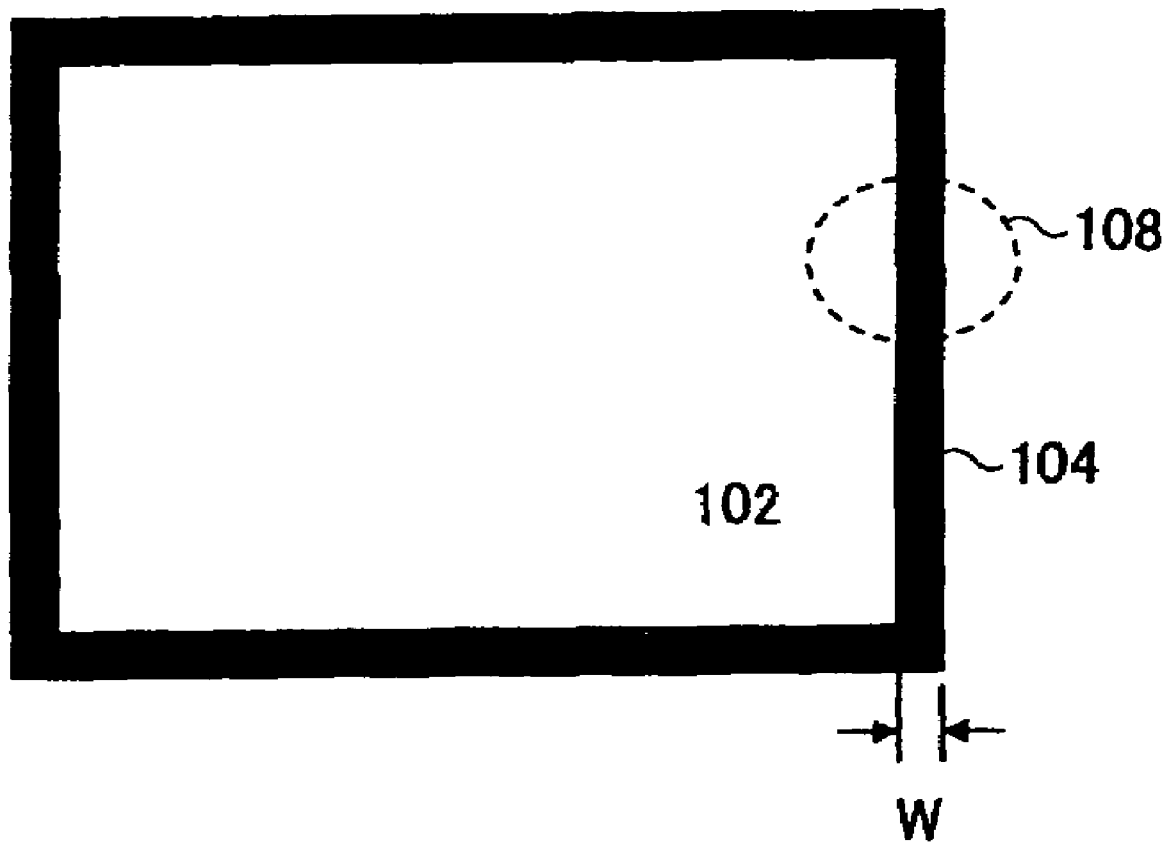
FIG. 1 shows a typical view of a LCD panel.
Figure 2:
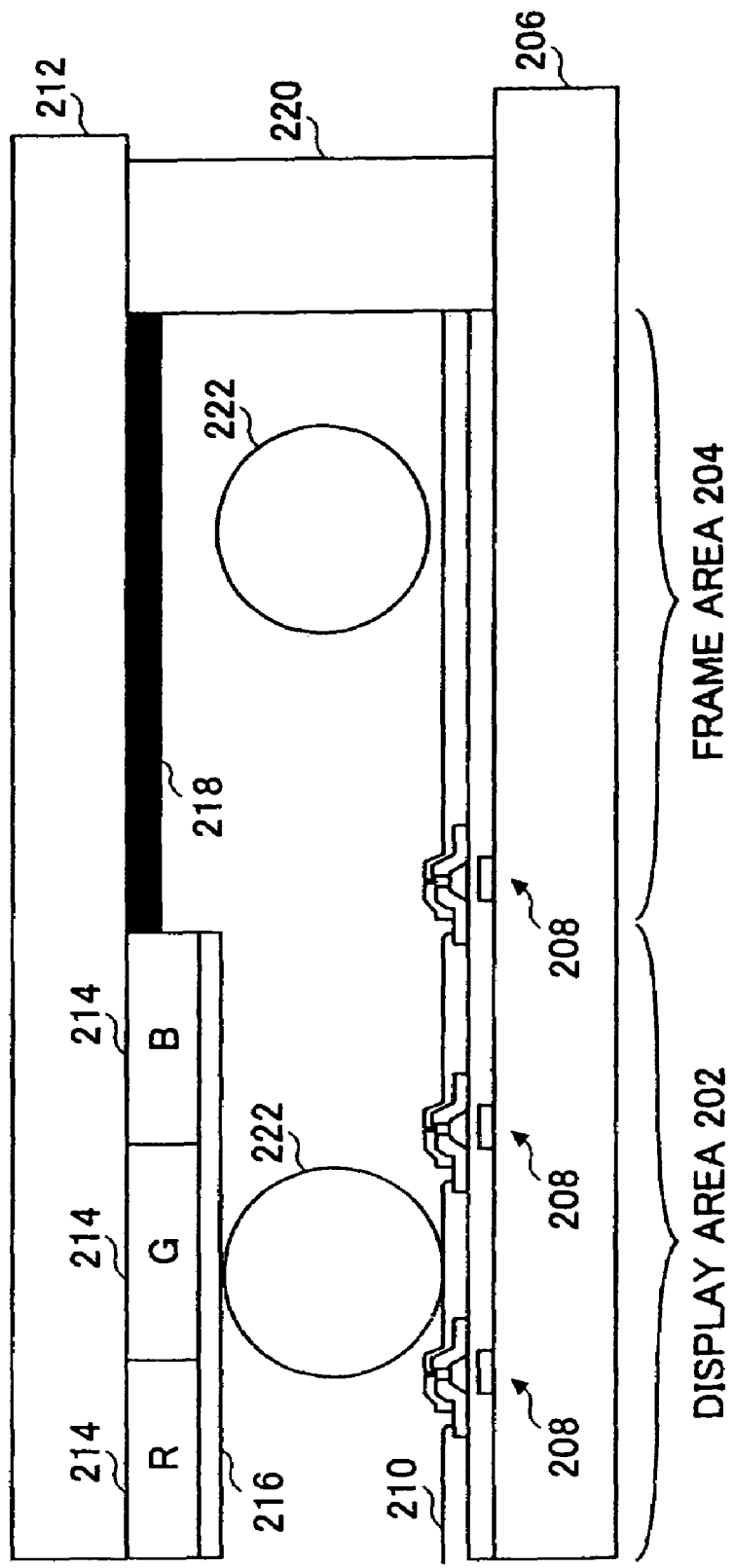
FIG. 2 shows a partial cross-sectional view of the first example of conventional LCD panels.
Figure 3:
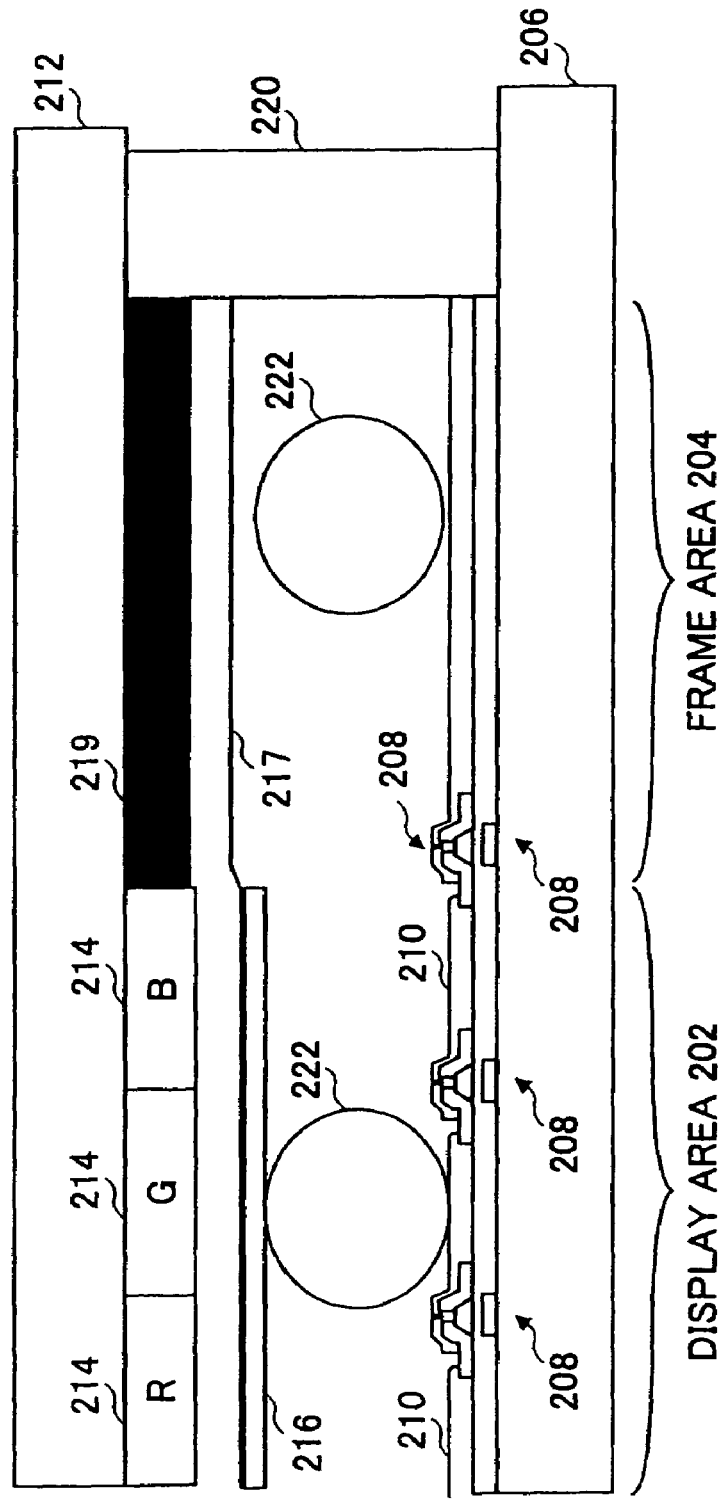
FIG. 3 shows a partial cross-sectional view of the second example of the conventional LCD panels.
Figure 4:
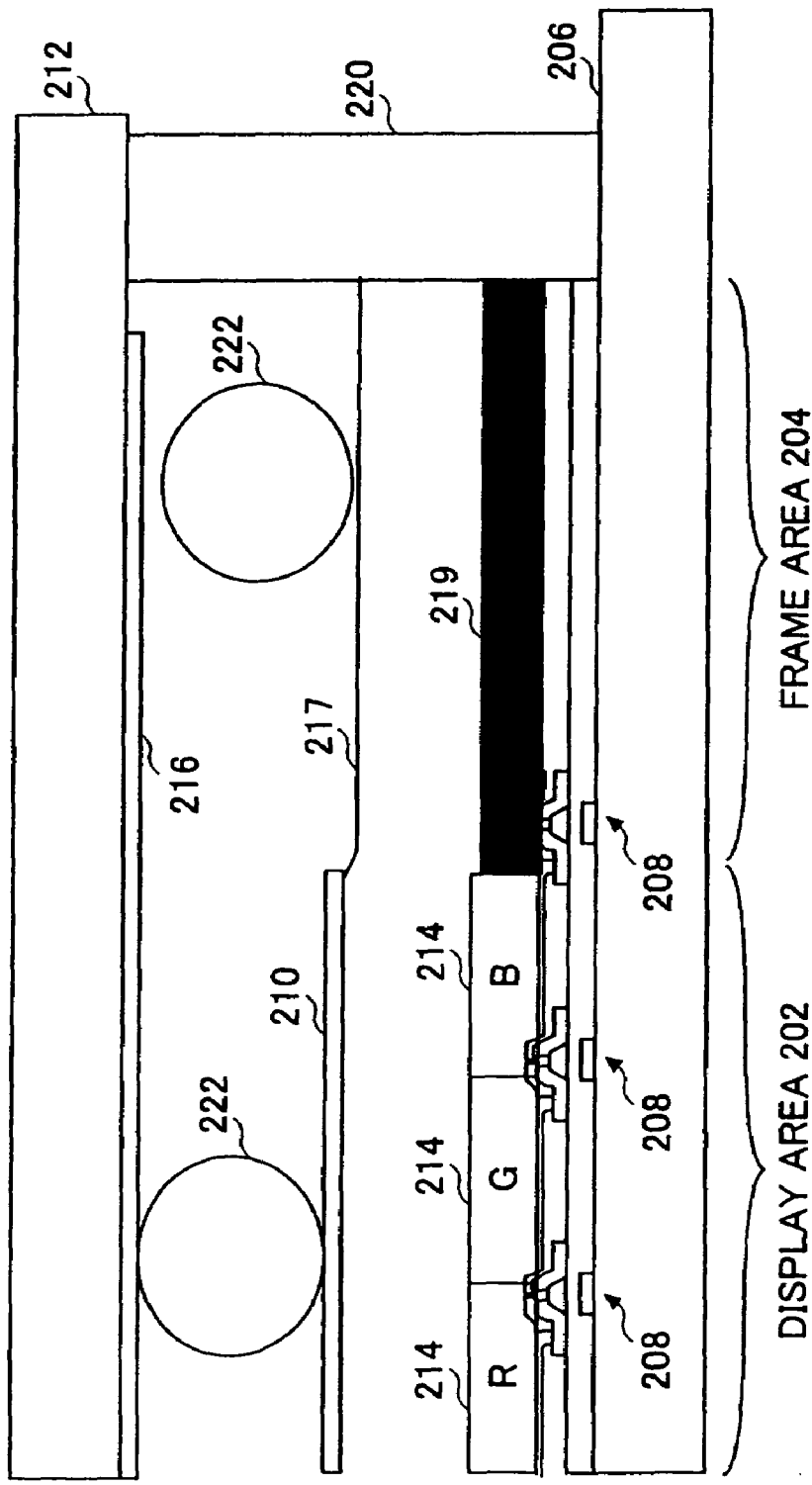
FIG. 4 shows a partial cross-sectional view of the third example of the conventional LCD panels.
Figure 5:
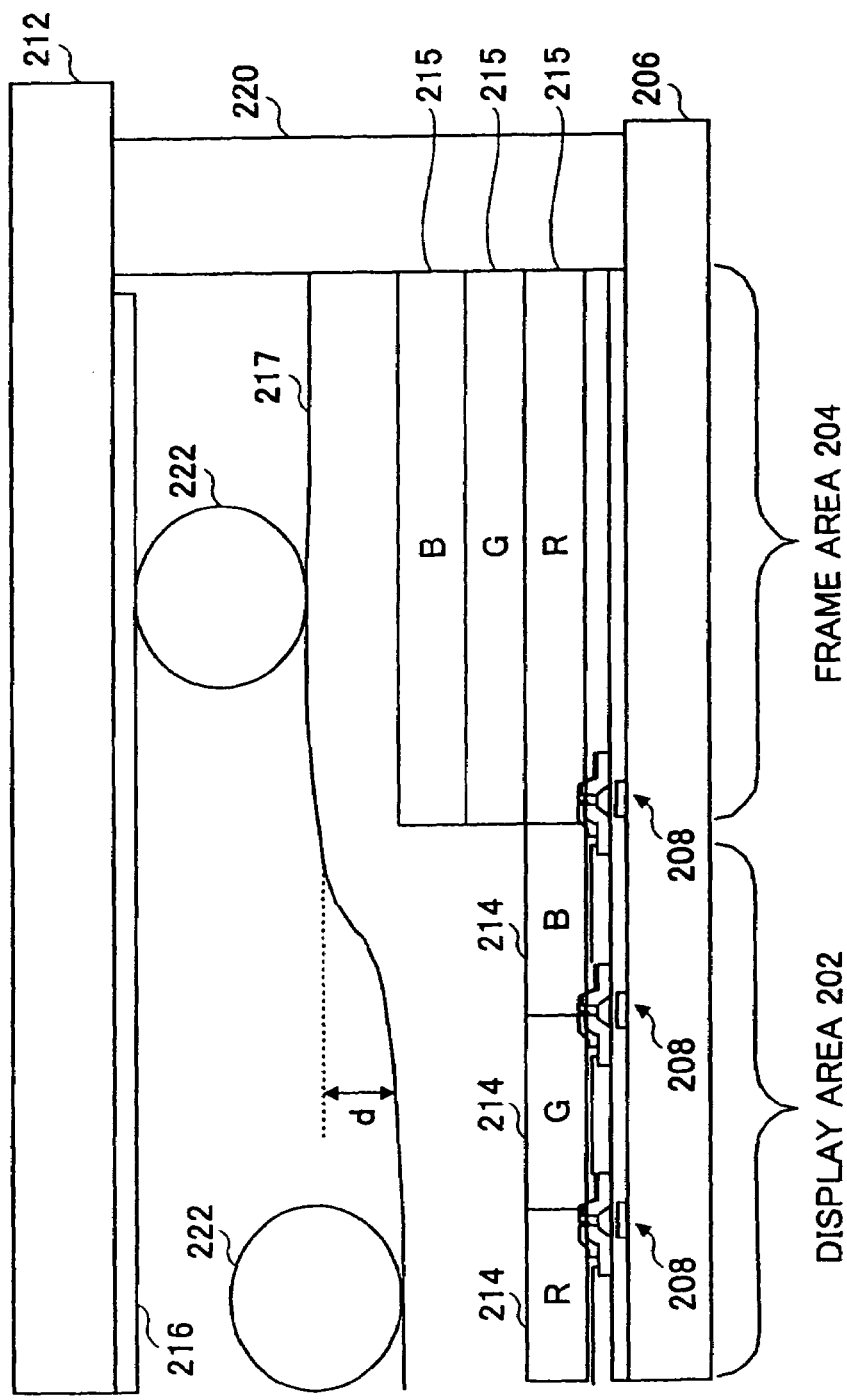
FIG. 5 shows a partial cross-sectional view of the fourth example of the conventional LCD panels.
Figure 6:
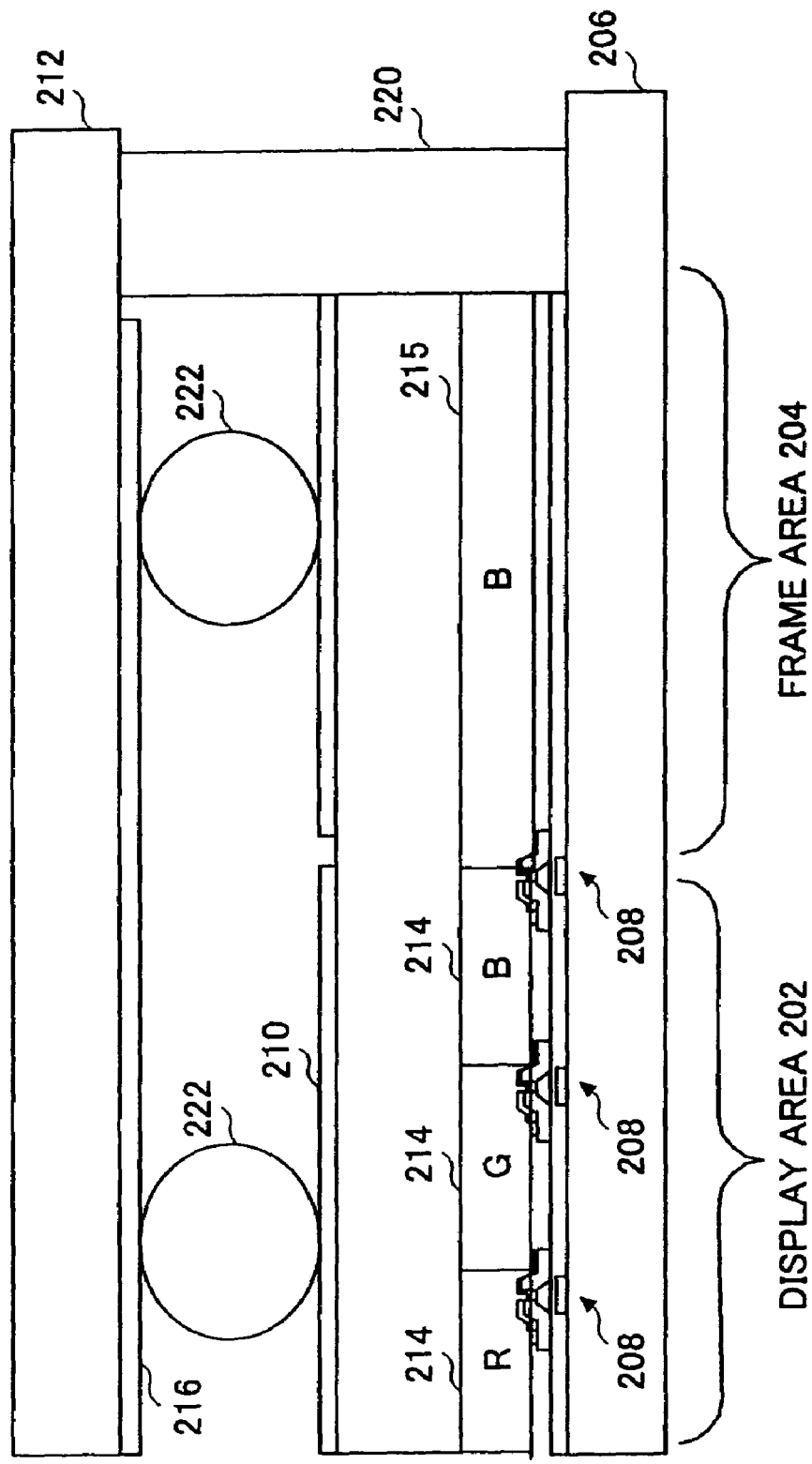
FIG. 6 shows a partial cross-sectional view of the fifth example of the conventional LCD panels.

While in operation, the light for display (backlight) is irradiated from the transparent substrate 702 to the transparent substrate 816. In the display area 902, each TFT 804 controls the orientation of the liquid crystal molecules, and an image is displayed through the transparent substrate 816. In this case, the backlight is also irradiated to the frame area 904. The light irradiated to the liquid crystal in the frame area 904 passes through the color filters 806' of three colors, and the three colors are combined. In other words, the light irradiated to the liquid crystal of the frame area becomes a combined light of the three primary colors, which is not a specific color. Therefore, viewing from the transparent substrate 816 side, the frame area 902 appears to be pure black. This is the great difference of the present invention from the conventional practice wherein the leaking light appears bluish as explained in reference to FIG. 6.

Furthermore, it is desirable to apply a suitable voltage between the electrode 814' and the counter-electrode 818 so that the liquid crystal in the frame area 904 is in a black state. Otherwise, there is a possibility of liquid crystal molecules in the frame area 904 becoming orientated in response to the electric field of the display area 902 when driving the LCD panel, allowing light to leak from the frame area 904. Then, for example, in the case that normally-black liquid crystal is used, that is, black is displayed when electric fields are not applied (since the liquid crystal molecules are orientated vertically to the orientation film), light leakage can be stably suppressed and the frame area 904 made to appear black by keeping the voltage between the electrodes 814' and 818 below a threshold voltage. In the case that normally-white liquid crystal is used, light leakage can be stably suppressed and the frame area 904 made to appear black by applying a suitable driving voltage between the electrodes 814' and 818.

In addition, it is possible to show the frame area somewhat black by controlling the state of the liquid crystal between the electrodes 814' and 818 without forming the color filters 806' that are formed according to the embodiment of the present invention. For example, if normally-black liquid crystal is used, black can be displayed by the normal state without applying a voltage. However, the black obtained in this manner is different from pure black, becoming such as somber black, thin black, and light black, and the performance of the frame becomes degraded. Since the embodiment of the present invention provides the color filters 806' in three colors, a combined light that is not a specific color is irradiated to the liquid crystal in the black state, and a high-quality frame is obtained.

Figure 10:
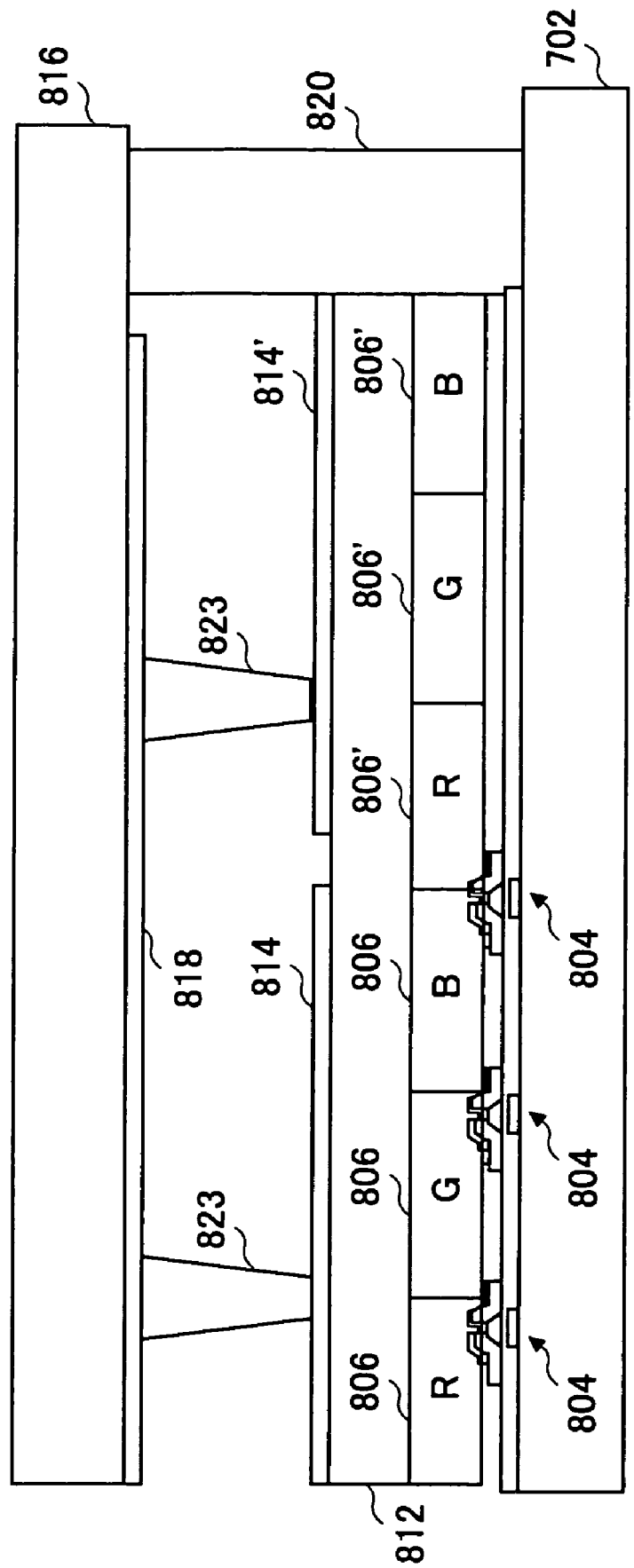
FIG. 10 is a cross-sectional view of a structure formed by a process after the structure of FIG. 9 is obtained.

FIG. 10 shows the structure of the LCD panel according to another embodiment of the present invention. Although the structure is almost the same as shown in FIG. 9, the present embodiment significantly differs in that the bead spacers 822 shown in FIG. 9 are not used. Instead, before sticking two transparent substrates together, pillar-shaped spacers 823 with a height of about 3.8 micrometers are formed on one or both of the transparent substrates. The pillar-shaped spacers 823 can be made of photosensitive acrylic resin using photolithography.

As explained above, the LCD panel according to the embodiment of the present invention includes a color filter layer that includes color filters for two or more colors, which color filter layer is prepared not only in the display area but also in the frame area of the transparent substrate that counters another transparent substrate. Since the light having passed through the color filters is not a specific color, and is irradiated to the liquid crystal layer between the electrodes, the frame appears clear black. Since the clear black frame is realized by the color filters, the liquid crystal layer, and the like, a shading layer such as a BM layer that is used only in the frame area is dispensed with.

According to the embodiment of the present invention, since red, green, and blue color filters are provided, a synthetic light (white light) that is not a specific color can be irradiated to the liquid crystal layer. For this reason, the clear black frame is realized.

According to the embodiment of the present invention, the liquid crystal layer consists of normally-black liquid crystal, and both electrodes are connected to the same voltage. Under this circumstance, a clean black frame is efficiently obtained by irradiating the light that is not a specific color to the liquid crystal layer.

According to the embodiment of the present invention, the thickness of the color filter layer in the frame area is equal to the thickness of the color filter layer in the display area. For this reason, the color filter layers of the display area and the frame area can be manufactured simultaneously, not increasing the number of manufacturing steps. Further, since a level difference does not occur in the neighborhood of the frame area, generating of display spots resulting from the level difference is suppressed.

According to an embodiment of the present invention, the transparent protective coat (overcoat layer) made of acrylic resin is provided between the pixel electrodes and the color filter layers. In this manner, the display area and the frame area are further flattened.

According to the embodiments of the present invention, a spacer member for regulating the thickness of the LCD panel can be provided in the frame area. If there is a level difference between the frame area and the display area, there will be little meaning in providing such a spacer member. This is because there is a possibility that display spots may occur since a spacer member enlarges the cell gap around the circumference of the display area if the cell gap is small, while not contributing to maintaining the cell gap if the cell gap in the frame area is large. Providing the spacer member in the frame area becomes significant when the level difference is substantially eliminated. Then, the function of the spacer is sufficiently demonstrated, that is, the cell gap is uniformly maintained over the whole region of the display area and the frame area. In this manner, the problem resulting from the level difference is effectively coped with.

According to the embodiment of the present invention, density of the color filters of one color can be set to be different from density of the color filters of another color. In this manner, the frame area can be a desired color. While the frame area should be prevented from being an unintended color, there are cases where the frame is desired to be a specific color. Since the embodiment of the present invention provides color filters 806' in three colors in the frame area, the desired color can be arranged for the frame area.

Further, the present invention is not limited to these embodiments, but various variations and modifications may be made without departing from the scope of the present invention.

The present application is based on Japanese Priority Application No. 2003-097103 filed on Mar. 31, 2003, with the Japanese Patent Office, the entire contents of which are hereby incorporated by reference.

According to the present invention, the performance of the frame area is improved, the frame area being around the circumference of the display area of a LCD panel. Further, the performance improvement is realized without using a BM layer that is conventionally used. Further, display spots are suppressed in the vicinity of the frame area. Furthermore, the frame color can be arranged as desired, avoiding the frame being an unintended color.

What is claimed is:

1. A liquid crystal display (LCD) panel, comprising a display area for displaying images, and a frame area that surrounds the display area, wherein the frame area comprises:

a first transparent substrate;

a second transparent substrate provided to counter the first substrate, a plurality of color filters provided side-by-side on the second transparent substrate, each of the color filters filtering one of at least two predetermined colors, a first electrode that counters the color filters, the first electrode being provided on the first transparent substrate, a second electrode provided on the second transparent substrate, the second electrode counters the first electrode across a liquid crystal layer, and the liquid crystal being inserted between the first electrode and the second electrode, wherein the first electrode and the second electrode are connected to a common voltage, and wherein said liquid crystal display panel is a normally-black liquid crystal panel.

2. The LCD panel as claimed in claim 1, wherein each of the color filters is one of red, green, and blue colors.

3. The LCD panel as claimed in claim 1, wherein thickness of the color filters in the frame area is equal to thickness of a plurality of color filters in the display area.

4. The LCD panel as claimed in claim 1, wherein a transparent protective coat is provided between the color filters and the first electrode.

5. The LCD panel as claimed in claim 1, wherein a spacer member for regulating the thickness of the LCD panel is provided in the frame area.

6. The LCD panel as claimed in claim 1, wherein an area occupancy ratio of the color filters in one color is different from an area occupancy ratio of the color filters in another color.

7. The LCD panel as claimed in claim 1, wherein a suitable driving voltage is applied between the first and second electrodes such that the combined light passing through the color filters makes the frame area appear black.

8. The LCD panel as claimed in claim 7, wherein each of the color filters is one of red, green, and blue colors.

9. The LCD panel as claimed in claim 1, wherein the voltage passed between the first and second electrode is kept below a threshold value such that the combined light passing through the color filters makes the frame area appear black.

10. The LCD panel as claimed in claim 9, wherein each of the color filters is one of red, green, and blue colors.

* * * * *